(12) United States Patent  
Molaire

(10) Patent No.: US 7,033,715 B2  
(45) Date of Patent: Apr. 25, 2006

(54) UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME

(75) Inventor: Michel F. Molaire, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 92 days.

(21) Appl. No.: 10/653,573

(22) Filed: Sep. 2, 2003

(65) Prior Publication Data

US 2004/0106052 A1    Jun. 3, 2004

Related U.S. Application Data

(60) Provisional application No. 60/430,219, filed on Dec. 2, 2002.

(51) Int. Cl.  
*G03G 5/047* (2006.01)  
*C09B 67/22* (2006.01)

(52) U.S. Cl. ............. 430/59.5; 540/140; 540/142

(58) Field of Classification Search ........... 430/59.2, 430/59.5; 540/140, 142  
See application file for complete search history.

(56) References Cited

U.S. PATENT DOCUMENTS

| | | | |
|---|---|---|---|
| 3,589,924 A | 6/1971 | Giamvalvo et al. | 106/288 Q |
| 4,555,467 A | 11/1985 | Hasegawa et al. | 430/110 |
| 4,701,396 A | 10/1987 | Hung et al. | 430/58 |
| 4,785,999 A | 11/1988 | Takijiri | 241/26 |
| 4,882,427 A | 11/1989 | Enokida et al. | 540/141 |
| 4,994,566 A | 2/1991 | Mimura et al. | 540/141 |
| 5,008,173 A | 4/1991 | Mimura et al. | 430/78 |
| 5,039,586 A | 8/1991 | Itami et al. | 430/78 |
| 5,055,368 A | 10/1991 | Nguyen et al. | 430/78 |
| 5,059,355 A | 10/1991 | Ono et al. | 252/584 |
| 5,112,711 A * | 5/1992 | Nguyen et al. | 430/59.5 |
| 5,132,197 A | 7/1992 | Iuchi et al. | 430/76 |
| 5,166,339 A | 11/1992 | Duff et al. | 540/141 |
| 5,194,354 A | 3/1993 | Takai et al. | 430/58 |
| 5,206,359 A | 4/1993 | Mayo et al. | 540/141 |
| 5,238,764 A | 8/1993 | Molaire et al. | 430/58 |
| 5,238,766 A | 8/1993 | Molaire et al. | 430/78 |
| 5,523,189 A | 6/1996 | Molaire | 430/58 |
| 5,614,342 A | 3/1997 | Molaire et al. | 430/78 |
| 5,629,418 A | 5/1997 | Molaire et al. | 540/141 |
| 5,766,810 A * | 6/1998 | Molaire et al. | 430/78 |
| 5,773,181 A | 6/1998 | Molaire et al. | 430/78 |
| 6,369,136 B1* | 4/2002 | Sorriero et al. | 523/501 |
| 2003/0019398 A1* | 1/2003 | Komatsu et al. | 106/412 |

* cited by examiner

*Primary Examiner*—John L Goodrow  
(74) *Attorney, Agent, or Firm*—Carl F. Ruoff

(57) ABSTRACT

In a process for forming a nanoparticulate crystalline titanium phthalocyanine pigment composition, a titanium phthalocyanine pigment is contacted with substantially pure 1,1,2-trichloroethane (TCE) under conditions effective to convert the titanium phthalocyanine pigment to the nanoparticulate crystalline composition.

19 Claims, No Drawings

UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME

CROSS-REFERENCE TO RELATED APPLICATIONS

Reference is made to and priority claimed from U.S. Provisional Application Ser. No. 60/430,219 Filed on Dec. 2,2002, entitled: UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME.

Reference is made to the following co-pending, commonly assigned applications, the disclosures of which are incorporated herein by reference:

U.S. Provisional Patent Application Ser. No. 60/430,922, filed on Dec. 4, 2002, in the names of Molaire, et al., entitled SELF-DISPERSING TITANYL PHTHALOCYANINE PIGMENT COMPOSITIONS AND ELECTROPHOTOGRAPHIC CHARGE GENERATION LAYERS CONTAINING SAME;

U.S. Provisional Patent Application Ser. No. 60/430,923, filed on Dec. 4, 2002, in the names of Molaire, et al., entitled TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME;

U.S. Provisional Patent Application Ser. No. 60/430,779, filed on Dec. 4, 2002, in the names of Molaire, et al., entitled COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME;

U.S. Provisional Patent Application Ser. No. 60/430,777, filed on Dec. 4, 2002, in the names of Molaire, et al., entitled PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID.

FIELD OF THE INVENTION

The present invention relates to electrophotographic elements and related materials. More particularly, the invention relates to a process for forming nanoparticulate pigment compositions including cocrystalline titanium phthalocyanine pigments, and further to the inclusion of these compositions in the charge generation layers of electrophotographic elements.

BACKGROUND OF THE INVENTION

In electrophotography, an image including a pattern of electrostatic potential, also referred to as an electrostatic latent image, is formed on a surface of an electrophotographic element including at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials that have been employed in electrophotographic elements are phthalocyanine pigments such as titanyl phthalocyanine and titanyl tetrafluorophthalocyanines. Electrophotographic recording elements containing such pigments as charge-generation materials are useful in electrophotographic laser beam printers because of their capability for providing good photosensitivity in the near infrared region of the electromagnetic spectrum, that is, in the range of 700–900 nm.

Flocculation of organic pigment dispersions has been a recognized problem, especially in the paint and coating industry, for some time. For example, U.S. Pat. No. 3,589,924 in the names of Giambalvo, et al., describes improved non-crystallizing, non-flocculating phthalocyanine pigment compositions formed by mixing 60–95% of a crystallization-or flocculation-susceptible phthalocyanine pigment with about 5–40% of a sulfonated phthalimidomethyl phthalocyanine derivative. The mixture is prepared by the usual methods, e.g., acid pasting or salt grinding, for converting the phthalocyanine materials to pigmentary size. However techniques that are designed primarily to provide suitable pigments for paints and industrial coatings may not yield materials of sufficient purity or the appropriate crystallinity characteristics to meet the stringent requirements of electrophotographic applications, where high purity is very important for ensuring reliable performance. The crystalline form of the final pigment also has a profound influence on the performance of an electrophotographic element containing it.

In a photoconductive layer produced from a liquid coating composition that includes the titanyl phthalocyanine pigment and a solvent solution of polymeric binder, it is necessary that the titanyl phthalocyanine pigment be in a highly photoconductive form, either crystalline or amorphous, and in a sufficiently stable dispersion to permit its application as a very thin layer having high electrophotographic speed in the near infrared region.

A variety of methods have been used to produce suitable forms of titanyl phthalocyanine having differing crystallographic characteristics. U.S. Pat. No. 5,166,339 in the names of Duff, et al., presents a table of polymorphs of unsubstituted titanyl phthalocyanine in which materials bearing multiple designations are grouped as four types. Many phthalocyanine pigments are discussed in P. M. Borsenberger and D. S. Weiss, *Organic Photoreceptors for Imaging Systems*, Marcel Dekker, Inc., New York, pp. 338–391.

In one type of preparation, commonly referred to as "acid-pasting", crude titanyl phthalocyanine is dissolved in an acid solution, which is then diluted with a non-solvent to precipitate the titanyl phthalocyanine product. In another type of procedure, the crude titanyl phthalocyanine is milled, generally with particular milling media. Additionally, some preparations include a combination of techniques or modify a previously prepared titanyl phthalocyanine.

U.S. Pat. No. 5,132,197 in the names of Iuchi, et al., teaches a method in which titanyl phthalocyanine is acid pasted, treated with methanol, and milled with ether, monoterpene hydrocarbon, or liquid paraffin to produce a titanyl phthalocyanine having main peaks of the Bragg angle 2Θ with respect to X-rays of Cu Kα at 9.0°, 14.2°, 23.9°, and 27.1° (all +/−0.2°).

U.S. Pat. No. 5,206,359 in the names of Mayo, et al., teaches a process in which titanyl phthalocyanine produced by acid pasting is converted to type IV titanyl phthalocyanine from Type X by treatment with halobenzene.

U.S. Pat. No. 5,059,355 in the names of Ono, et al., teaches a process in which titanyl phthalocyanine is shaken with glass beads, producing an amorphous material having no substantial peaks detectable by X-ray diffraction. The amorphous material is stirred, with heating, in water and ortho-dichlorobenzene; methanol is added after cooling. A crystalline material having a distinct peak at 27.3° is produced.

U.S. Pat. No. 4,882,427 in the names of Enokida, et al., teaches a material having noncrystalline titanyl phthalocyanine and pseudo-non-crystalline titanyl phthalocyanine. The pseudo-noncrystalline material can be prepared by acid pasting or acid slurrying. The noncrystalline titanyl phthalocyanine can be prepared by acid pasting or acid slurrying followed by dry or wet milling, or by mechanical milling for a long time without chemical treatment.

U.S. Pat. No. 5,194,354 in the names of Takai, et al., teaches that amorphous titanyl phthalocyanine prepared by dry pulverization or acid pasting can be converted, by stirring in methanol, to a low crystalline titanyl phthalocyanine having strong peaks of the Bragg angle 2Θ with respect to X-rays of Cu Kα at 7.2°, 14.2°, 24.0°, and 27.2° (all +/−0.2°). It is stated that the low crystalline material can be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks +/−0.2°).

U.S. Pat. Nos. 4,994,566 and 5,008,173 both in the names of Mimura, et al., teach a process in which non-crystalline particles produced by acid pasting or slurrying, followed by mechanical grinding or sublimation, are treated with tetrahydrofuran to produce a titanyl phthalocyanine having infrared absorption peaks at 1332, 1074, 962, and 783 $cm^{-1}$.

U.S. Pat. No. 5,039,586 in the name of Itami, teaches acid pasting, followed by milling in aromatic or haloaromatic solvent, with or without additional water or other solvents such as alcohols or ethers, at 20–100° C. In an example, crude titanyl phthalocyanine is milled with α-chloronaphthalene or ortho-dichlorobenzene as milling medium, followed by washing with acetone and methanol. The titanyl phthalocyanine produced has a first maximum intensity peak of the Bragg angle 2Θ with respect to X-rays of Cu Kα at a wavelength of 1.541 Å at 27.3°+/−0.2°, and a second maximum intensity peak at 6.8°+/−0.2°. This was contrasted with another titanyl phthalocyanine that is similarly milled, but not acid pasted. This material has a maximum peak at 27.3°+/−0.2° and a second maximum intensity peak at 7.5°+/−0.2°.

U.S. Pat. No. 5,055,368 in the names of Nguyen, et al., teaches a "salt-milling" procedure in which crude titanyl phthalocyanine is milled, first under moderate shearing conditions with milling media including inorganic salt and non-conducting particles. The milling is then continued at higher shear and temperatures up to 50° C., until the pigment undergoes a perceptible color change. Solvent is substantially absent during the milling steps.

U.S. Pat. No. 4,701,396 in the names of Hung, et al., teaches near infrared sensitive photoconductive elements made from fluorine-substituted titanylphthalocyanine pigments. While phthalocyanines having only fluorine substituents, and those being equal in number on each aromatic ring, are the preferred pigments of the invention described in that patent, various non-uniformly substituted phthalocyanines are taught.

U.S. Pat. No. 5,112,711 in the names of Nguyen, et al., teaches an electrophotographic element having a physical mixture of titanyl phthalocyanine crystals and titanyl fluorophthalocyanine crystals. The element provides a synergistic increase in photosensitivity in comparison to an expected additive combination of titanyl phthalocyanine and titanyl fluorophthalocyanine. Similar elements having physical mixtures combining titanyl phthalocyanine and chloro- or bromo-substituted titanyl phthalocyanine crystals produce results in which the photosensitivity is close to that of the least sensitive of the two phthalocyanines used.

U.S. Pat. Nos. 5,238,764 and 5,238,766, both in the names of Molaire, et al., teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a $gamma_c$ hydrogen bonding parameter value greater than 9.0. These patents further teach that this reduction in sensitivity can be prevented by first contacting the titanyl fluorophthalocyanine with a material having a $gamma_c$ hydrogen bonding parameter of less than 8.0.

Molaire, et al., in U.S. Pat. No. 5,629,418, discloses a method for preparing titanyl fluorophthalocyanine that includes the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed and contacting it with an organic solvent, which results in the conversion of the amorphous material to high crystallinity titanyl fluorophthalocyanine, the amorphous titanyl fluorophthalocyanine having been maintained in contact with water continuously from its precipitation to its conversion to a crystalline form.

The particle size distribution and stability of charge generation dispersions are very important for providing uniform charge generation layer in order to control generation of "breakdown spots" and minimize the granularity of prints. In U.S. Pat. Nos. 5,614,342 and 5,766,810 both in the names of Molaire and Kaeding, disclose a method for preparing cocrystals of titanyl fluorophthalocyanine and unsubstituted titanyl phthalocyanine that includes the steps of: admixing crude titanyl phthalocyanine and crude titanyl fluorophthalocyanine to provide an amorphous pigment mixture, as determined by X-ray crystallography using X-radiation characteristic of Cu Kα at a wavelength of 1.541 Å of the Bragg angle 2Θ; contacting the amorphous pigment mixture with an organic solvent having a $gamma_c$ hydrogen bonding parameter of less than 8:0; and, prior to contacting, substantially excluding the amorphous pigment mixture from contact with an organic solvent having a $gamma_c$ hydrogen bonding parameter greater than 9.0. The amorphization step must be substantially complete so as to break the large primary particles of the starting crude pigments and thereby lower the average particle size of the final cocrystalline mixture. Substantially complete amorphization of the crude pigments is also necessary to prevent degradation of the dark decay characteristics of the final cocrystal; small amounts of crude pigments having inherently high dark decay that are not amorphized would not be affected by the subsequent solvent treatment and therefore would retain their high dark decay characteristics, causing degradation of the dark decay property of the final cocrystalline product.

Molaire, et al., in U.S. Pat. No. 5,523,189, discloses an electrophotographic element including a charge generation layer that includes a binder in which is dispersed a physical mixture of a high speed titanyl fluorophthalocyanine having a first intensity peak with respect to X-rays characteristic of Cu Kα at a wavelength of 1.541 Å of the Bragg angle 2Θ at 27°±0.2°, and a second intensity peak at 7.3°±0.2°, the second peak having an intensity relative to the first peak of less than 60 percent; and a low speed titanyl fluorophthalocyanine having a first intensity peak with respect to X-rays characteristic of Cu Kα at a wavelength of 1.541 Å of the Bragg angle 2Θ at 6.7°±0.2°, and a second intensity peak at 23°±0.2°, the second peak having an intensity relative to the first peak of less than 50 percent.

Molaire, et al., in U.S. Pat. No. 5,773,181, discloses a method for preparing a phthalocyanine composition including the steps of: synthesizing a crystalline product including a mixture of five different unsubstituted or fluorosubstituted phthalocyanines, wherein a central M moiety bonded to the four inner nitrogen atoms of the phthalocyanine nuclei represents a pair of hydrogen atoms or a covalent or coordinate bonded moiety, including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb, with M preferably representing Ti=O; increasing the amorphous character of the mixture of phthalocyanines as determined by X-ray crystallography using X-radiation characteristic of Cu Kα at a wavelength of 1.541 Å of the Bragg angle 2Θ to provide an amorphous pigment mixture; contacting the amorphous pigment mixture with organic solvent having a $gamma_c$ hydrogen bonding parameter of less than 8.0; and prior to the contacting, substantially excluding the amorphous pigment mixture from contact with organic solvent having a $gamma_c$ hydrogen bonding parameter greater than 9.0.

The procedures for the preparation of titanyl phthalocyanine pigments described in the foregoing patents, all of whose disclosures are incorporated herein by reference, suffer from various deficiencies and disadvantages. For example, the use of acid presents a shortcoming for both environmental and safety concerns, particularly in commercial scale procedures. Also, salt milling avoids the use of acid but requires extensive washing of the milled material to remove salts, which can otherwise cause high dark decay in a photoconductor.

Procedures that first contact the titanyl fluorophthalocyanine with a solvent such as methanol or tetrahydrofuran that has a $gamma_c$ hydrogen bonding parameter value greater than 9.0 cause a significant reduction in near infrared sensitivity. The preparation of titanyl fluorophthalocyanine having good photogeneration characteristics is expensive. It would be desirable to be able to produce a crystalline titanyl phthalocyanine composition that has good photogeneration characteristics when used in an electrophotographic element but is less expensive than titanyl fluorophthalocyanine. A suitable procedure would avoid deleterious contact with high $gamma_c$ hydrogen bonding parameter solvents and also not require the use of acid or of salt milling media.

The present inventors believe that the effect of particle size distribution on photo speed relates more to the breadth of the distribution than the absolute size of the pigment particles. At the same time, the lower the particle size, the less the propensity for breakdown. Thus, there is a need for dispersions with smaller and more uniform particle size distribution.

SUMMARY OF THE INVENTION

The present invention is directed to a process for forming a nanoparticulate crystalline titanium phthalocyanine pigment composition that includes contacting a titanium phthalocyanine pigment with substantially pure 1,1,2-trichloroethane (TCE) under conditions effective to convert the titanium phthalocyanine pigment to the nanoparticulate crystalline composition.

DETAILED DESCRIPTION OF THE INVENTION

Unsubstituted titanyl phthalocyanine, abbreviated herein as "TiOPc", has the following structural formula:

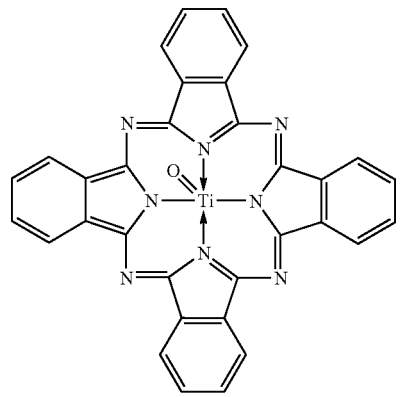

Titanyl fluorophthalocyanines, abbreviated herein as "TiFOPc", have the following structural formula:

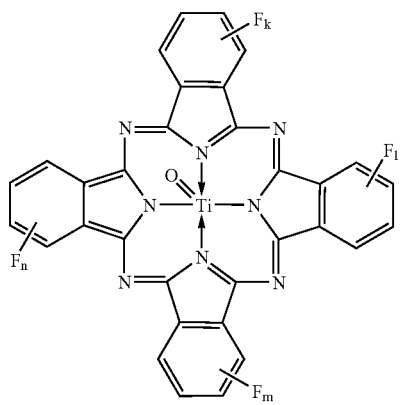

wherein each of k, l, m, and n is independently an integer from 1 to 4.

In the process of the present invention, the titanium phthalocyanine pigment can be contacted with the substantially pure TCE in its vapor or liquid form. Preferably, the pigment is wet milled in TCE using a milling aid such as steel shot. Wet milling is carried out preferably for about 10 minutes to about 96 hours, more preferably, about 30 minutes to about 6 hours.

Also, in accordance with the present invention, the titanium phthalocyanine pigment can be contacted with the substantially pure TCE using ultrasonication for a time period preferably of about 15 minutes to about 2 hours, more preferably, about 10 minutes to about 1 hour.

The titanium phthalocyanine pigment employed in the process of the invention preferably includes a cocrystalline mixture of unsubstituted titanyl phthalocyanine (TiOPc) and titanyl fluorophthalocyanine (TiOFPc), wherein the weight ratio of TiOPc:TiOFPc is preferably about 99.5:0.5 to about 70:30, more preferably, about 95:5 to about 75:25.

Alternatively, the titanium phthalocyanine pigment employed in the process of the invention can include crystalline titanium fluorophthalocyanine (TiOFPc), which can be a mixture including titanyl 2, 9, 16, 23-tetrafluoropthalocyanine, titanyl 2, 9, 16-trifluorophthalocyanine, titanyl 2-fluorophthalocyanine, titanyl 2, 9-difluorophthalocyanine, and titanyl 2, 16-difluorophthalocyanine.

The present inventors have discovered that the use of 1,1,2-trichloroethane (TCE) as the sole solvent affords very uniform, substantially monodisperse, nanoparticulate dispersions of cocrystalline titanyl fluorophthalocyanine and unsubstituted titanyl fluorophthalocyanine. Additionally, they have found that dispersions formed using TCE as the sole solvent exhibit unusual stability toward settling. As a further advantage, the nanoparticle dispersions of the present invention can be obtained without the use of a polymeric binder.

The following examples serve to illustrate the invention:

COMPARATIVE EXAMPLE 1

A dispersion of a cocrystalline composition of unsubstituted titanyl phthalocyanine (TiOPc) and titanyl fluorophthalocyanine (TiOFPc), using a 1.5 gallon attritor, 3300 ml of 3 mm stainless steel media, 5.9 g of the copolyester ionomer poly{2,2-dimethyl-1,3-propylene-oxydiethylene (80/20) isophthalate-co-5-sodiosulfoiisophthalate (95/5)}, (prepared as described in U.S. Pat. No. 5,523,189), 23.68 g of a cocrystalline mixture of 90/10 TiOPc-TiOFPc prepared from a mixture of the amorphous pigments according to the method described in the previously discussed U.S. Pat. No. 5,614,342, and a solvent mixture of 222.24 g of DCM and 148.16 g of TCE. The concentrated dispersion was mixed with a preformed solution consisting of 17.8 g of binder, 591.6 g of DCM, and 200.62 g of TCE. The resulting dispersion was diluted to 3% solids, and the particle size distribution was determined using a UPA Ultraparticle Analyzer.

EXAMPLE 1

A TiOPc-TiOFPc dispersion was prepared using the same procedure and materials as described in Comparative Example 1, except that the solvent consisted solely of TCE. The particle size distribution was determined and compared with that of the dispersion of Comparative Example 1. The results are shown in TABLE 1 following:

TABLE 1

| Example | Particle Size (microns) | | |
| --- | --- | --- | --- |
| | 10% | 50% | 90% |
| Comparative Example 1 90/10 TiOPc-TiOFPc in 60:40 DCM:TCE | 0.226 | 0.433 | 0.736 |
| Example 1 90/10 TiOPc-TiOFPc in TCE | 0.036 | 0.086 | 0.182 |

The results given in TABLE 1 illustrate the desirable reduction in particle size at both 10% and 50% when pure TCE is used in place of a mixture of DCM and TCE in the preparation of the TiOPc-TiOFPc dispersion.

COMPARATIVE EXAMPLE 2

A mixture of 0.2 g of 90/10 cocrystalline TiOPc-TiOFPc and 5 g each of DCM and TCE was mixed in a vial without any polymeric binder and ultrasonicated for 3 hours, following which the particle size distribution of the resulting dispersion was measured.

EXAMPLE 2

The procedure of Comparative Example 2 was repeated, except that 10 grams of TCE was used in place of the DCM-TCE mixture. Following ultrasonication, the particle size distribution of the resulting dispersion was determined.

EXAMPLE 3

The procedure employed in Example 2 was repeated, using acid pasted crystalline titanyl fluorophthalocyanine as the pigment in place of 90/10TiOPc-TiOFPc. The particle size distribution of the resulting dispersion was measured and compared with those of the dispersions described in Comparative Example 2 and Example 2; the results are summarized in TABLE 2 following:

TABLE 2

| Example | Particle Size (microns) | | |
| --- | --- | --- | --- |
| | 10% | 50% | 90% |
| Comparative Example 2 90/10 TiOPc-TiOFPc in 50:50 DCM:TCE | 0.1071 | 0.2369 | 0.401 |
| Example 2 90/10 TiOPc-TiOFPc in TCE | 0.022 | 0.0384 | 0.106 |
| Example 3 TiOFPc (ZP4) In TCE | 0.0258 | 0.049 | 0.129 |

The results presented in TABLE 2 demonstrate that nanoparticulate dispersions can be obtained from pigments dispersed in TCE alone, in the absence of a binder polymer.

COMPARATIVE EXAMPLE 3

A dispersion was made in the same manner as described in Comparative Example 1, except that the polymeric binder was the copolyester ionomer poly{4,4-xylylene-co-2,2'-oxydiethylene (46/54) isophthalate-co-5-sodiosulfoisophthalate (85/15)} (prepared as described in U.S. Pat. No. 5,523,189). The particle size distribution of the dispersion following dilution was determined as described in Comparative Example 1.

EXAMPLE 4

The same procedure was used as that described in Comparative Example 3, except that the solvent consisted solely of TCE. The particle size distribution was determined and compared with that of the dispersion of Comparative Example 3. The results are shown in TABLE 3 following:

TABLE 3

| | Particle Size (microns) | | |
|---|---|---|---|
| Example | 10% | 50% | 90% |
| Comparative Example 3 90/10 TiOPc-TiOFPc in 60:40 DCM:TCE | 0.386 | 0.55 | 0.826 |
| Example 4 90/10 TiOPc-TiOFPc in TCE | 0.0385 | 0.0807 | 0.1449 |

The results presented in TABLE 3 are similar to those of TABLE 1 but illustrate the desirable reduction in particle size extending to 90%.

EXAMPLE 5

A 75/25 TiOPc-TiOFPc cocrystalline pigment, prepared as described in U.S. Pat. No. 5,614,342, was used to prepare a series of dispersions in the following solvents: ethanol, methyl ethyl ketone (MEK), toluene, tetrahydrofuran (THF), dichloromethane (DCM), and 1,1,2 trichloroethane (TCE). The dispersions were ultrasonicated for 15 minutes just prior to transfer of a sample of each to a 10-ml graduated cylinder. The meniscus of the dispersion was adjusted to the 10 ml mark, and the cylinders were sealed with a cork stopper. The dispersions were periodically inspected for settling, the results being summarized in TABLE 4 following:

TABLE 4

| | Percent of Settled Volume | | |
|---|---|---|---|
| Solvent | After 5 Hours | After 74 Hours | After 98 Hours |
| Ethanol | 2 | 24 | 27 |
| MEK | 1 | 22 | 26 |
| Toluene | 0 | 18 | 22 |
| THF | 7 | 30 | 31 |
| DCM | 0 | 5 | 7 |
| TCE | 0 | 0 | 0 |

The results summarized in TABLE 4 demonstrate the very large improvement in settling tendency, even on prolonged standing, provided by dispersions prepared in TCE in accordance with the present invention.

EXAMPLE 6

Dispersions of cocrystalline compositions of unsubstituted titanyl phthalocyanine (TiOPc) and titanyl fluorophthalocyanine (TiOFPc) were prepared, using a 1.5 gallon attritor, 3300 ml of 3 mm stainless steel media, 5.9 g of the copolyester ionomer poly{2,2-dimethyl-1,3-propyleneoxydiethylene (80/20) isophthalate-co-5-sodiosulfoiisophthalate (95/5)}, (prepared as described in U.S. Pat. No. 5,523,189), and 23.68 g each of five cocrystalline TiOPc-TiOFPc compositions prepared by the method described in the previously discussed U.S. Pat. No. 5,614,342. Four amorphous pigment mixtures were dispersed either in 370 g of TCE or 370 g of a 60/40 (by wt.) mixture of DCM and TCE. The following amorphous mixtures, designated Pigment Mixtures A, B, C, and D, were used to prepare these concentrated dispersions:

Pigment Mixture A—a 90/10 mixture of crude substantially chlorine-free TiOPc and crude TiOFPc, as described in Example 1 of co-pending related application TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME.

Pigment Mixture B—like Pigment Mixture A, but containing an 87.5/12.5 mixture of crude substantially chlorine-free TiOPc and crude TiOFPc.

Pigment Mixture C—a 90/10 mixture of highly crystalline, substantially chlorine-free TiOPc obtained from H. W. Sands Corporation and crude TiOFPc, as described in Example 2 of co-pending related application TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME.

Pigment Mixture D—a 90/10 mixture of lightly chlorinated Cl—TiOPc and crude TiOFPc, as described in Example 2 of co-pending related application COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME.

The concentrated dispersions were mixed with corresponding preformed solutions consisting of 17.8 g of binder, and 792 g of either TCE or a 60/40 DCM/TCE mixture. The resulting dispersions were diluted to 3% solids and evaluated for settling using the procedure described in Example 5. The results are summarized in TABLE 5 following:

TABLE 5

| | | | Percent of Settled Volume | | |
|---|---|---|---|---|---|
| Dispersion | Pigment Mixture | Solvent | After 24 Hours | After 68 Hours | After 122 Hours |
| 1 (Comparison) | A | 60/40 DCM/TCE | 5 | 10 | 22 |
| 2 (Invention) | B | TCE | 0 | 0 | 0 |
| 3 (Invention) | C | TCE | 0 | 1 | 2 |
| 4 (Comparison) | D | 60/40 DCM/TCE | 4 | 5 | 8 |
| 5 (Invention) | D | TCE | 0 | 0 | 0 |

The results summarized in TABLE 5 demonstrate the resistance to settling, even on prolonged standing, exhibited by dispersions prepared in substantially pure TCE compared with dispersions prepared in a DCM/TCE mixture.

The invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A process for forming a uniform, substantially monodisperse, nanoparticulate crystalline titanium phthalocyanine pigment composition, said process comprising:
   contacting a crystalline titanium phthalocyanine pigment with 1,1,2-trichloroethane (TCE) as the sole solvent under conditions of wet milling or ultrasonication effective to convert said titanium phthalocyanine pigment to the uniform, substantially monodisperse, nanoparticulate crystalline titanium phthalocyanine pigment composition.

2. The process of claim 1 wherein said contacting said titanium phthalocyanine pigment with TCE as the sole solvent is carried out using wet milling.

3. The process of claim 2 wherein said wet milling is carried out for a time period of about 10 minutes to about 96 hours.

4. The process of claim 3 wherein said wet milling is carried out for a time period of about 30 minutes to about 6 hours.

5. The process of claim 1 wherein said contacting said titanium phthalocyanine pigment with TCE as the sole solvent is carried out using ultrasonication.

6. The process of claim 5 wherein said ultrasonication is carried out for a time period of about 15 minutes to about 2 hours.

7. The process of claim 6 wherein said ultrasonication is carried out for a time period of about 10 minutes to about 1 hour.

8. The process of claim 1 wherein said titanium phthalocyanine pigment comprises a cocrystalline mixture of unsubstituted titanyl phthalocyanine (TiOPc) and titanyl fluorophthalocyanine (TiOFPc).

9. The process of claim 8 wherein said cocrystalline mixture of TiOPc and TiOFPc has a weight ratio of TiOPc:TiOFPc of about 99.5:0.5 to about 70:30.

10. The process of claim 9 wherein said cocrystalline mixture of TiOPc and TiOFPc has a weight ratio of TiOPc:TiOFPc of about 95:5 to about 75:25.

11. The process of claim 10 wherein said cocrystalline mixture of TiOPc and TiOFPc has a weight ratio of TiOPc:TiOFPc of about 87.5:12.5.

12. The process of claim 1 wherein said titanium phthalocyanine pigment comprises crystalline titanium fluorophthalocyanine (TiOFPc).

13. The process of claim 12 wherein said crystalline titanyl fluorophthalocyanine (TiOFPc) is a mixture comprising titanyl 2,9,16,23-tetrafluorophthalocyanine, titanyl 2,9,16-trifluorophthalocyanine, titanyl 2-fluorophthalocyanine, titanyl 2,9-difluorophthalocyanine, and titanyl 2,16-difluorophthalocyanine.

14. The process of claim 1 further comprising:
combining said titanium phthalocyanine pigment with a polymeric binder in TCE as the sole solvent.

15. The process of claim 14 wherein said polymeric binder comprises a polyester ionomer.

16. The process of claim 15 wherein said polyester ionomer is poly {4,4-xylylene-co-2,2'-oxydiethylene (46/54) isophthalate-co-5-sodiosulfoisophthalate (85/15).

17. An electrophotographic charge generation layer comprising a uniform, substantially monodisperse, nanoparticulate crystalline titanium phthalocyanine pigment composition formed by the process of claim 1 wherein the pigment has the particle size as follows: a 10 percentile particle size from about 0.02 micron to about 0.04 micron; a 50 percentile particle size from about 0.04 micron to about 0.09 micron; and a 90 percentile particle size from about 0.1 micron to about 0.2 micron.

18. An electrophotographic charge generation layer coating dispersion comprising a uniform, substantially monodisperse, nanoparticulate crystalline titanium plithalocyanine pigment composition formed by the process of claim 1 wherein the pigment has the particle size as follows: a 10 percentile particle size from about 0.02 micron to about 0.04 micron; a 50 percentile particle size from about 0.04 micron to about 0.09 micron; and a 90 percentile particle size from about 0.1 micron to about 0.2 micron.

19. The electrophotographic charge generation layer coating dispersion of claim 18 having a settling stability of at least about 120 hours.

* * * * *